United States Patent
Xu et al.

(10) Patent No.: US 11,352,282 B1
(45) Date of Patent: Jun. 7, 2022

(54) METHOD FOR REUSING FARMLAND DRAINAGE

(71) Applicant: Jilin Jianzhu University, Changchun (CN)

(72) Inventors: Yingying Xu, Changchun (CN); Xu Yang, Changchun (CN); Yan Yi, Changchun (CN); Yingbo Dou, Changchun (CN)

(73) Assignee: JILIN JIANZHU UNIVERSITY, Changchun (CN)

( * ) Notice: Subject to any disclaimer, the term of this patent is extended or adjusted under 35 U.S.C. 154(b) by 0 days.

(21) Appl. No.: 17/526,230

(22) Filed: Nov. 15, 2021

(30) Foreign Application Priority Data

Dec. 15, 2020 (CN) .......................... 202011481611.4

(51) Int. Cl.
*C02F 9/00* (2006.01)
*C02F 1/52* (2006.01)
*C02F 1/00* (2006.01)

(52) U.S. Cl.
CPC ................ *C02F 9/00* (2013.01); *C02F 1/004* (2013.01); *C02F 1/52* (2013.01); *C02F 2301/08* (2013.01)

(58) Field of Classification Search
CPC ................................ A01C 3/00; A01K 1/0103
USPC ........................................................ 210/603
See application file for complete search history.

(56) References Cited

U.S. PATENT DOCUMENTS

| | | | |
|---|---|---|---|
| 6,346,197 B1 * | 2/2002 | Stephenson | C02F 9/00 210/197 |
| 2002/0166819 A1 * | 11/2002 | Dutil | B01D 17/06 210/723 |
| 2007/0199868 A1 * | 8/2007 | Volpe | C02F 1/463 210/748.01 |
| 2010/0176061 A1 * | 7/2010 | Monzyk | C02F 1/56 252/60 |

(Continued)

FOREIGN PATENT DOCUMENTS

| CN | 107879523 A | 4/2018 |
|---|---|---|
| CN | 209242850 U | 8/2019 |
| CN | 209702480 U | 11/2019 |

OTHER PUBLICATIONS ip. com English Machine Translation CN 107879523 A. published Apr. 6, 2018. CN 107879523. (Year: 2018).*

*Primary Examiner* — Nina Bhat
(74) *Attorney, Agent, or Firm* — WPAT, PC

(57) ABSTRACT

A method for reusing farmland drainage is provided. A device used in the method includes a purifying pond, a filtering mechanism, a water pump and a drainage pipe. The method includes steps: (a) siting a wide and suitable place close to farmland to construct the purifying pond according to landform characteristics of the farmland, and performing an anti-seepage treatment on the purifying pond, and connecting the purifying pond with anti-seepage channels of the farmland; (b) adding flocculants into water through the filtering mechanism to remove particulate organic substances, suspended substances, colloid and phosphate pollutants thereof; and (c) pumping and discharging the purified water to an upstream of each of the anti-seepage channels through the water pump and the drainage pipe to refuse the water. The filtering mechanism arranged on a water inlet (Continued)

pipe of the purifying pond can filter impurities in farmland drainage to avoid water pollution.

5 Claims, 3 Drawing Sheets

(56) References Cited

U.S. PATENT DOCUMENTS

| | | | | |
|---|---|---|---|---|
| 2010/0300962 | A1* | 12/2010 | Semenza | C02F 1/5236 210/207 |
| 2010/0307973 | A1* | 12/2010 | Grcevic | B01D 61/025 210/639 |
| 2012/0298526 | A1* | 11/2012 | Haivala | B03C 5/026 205/742 |
| 2014/0014577 | A1* | 1/2014 | Wakahara | C02F 3/2893 210/603 |
| 2015/0014245 | A1* | 1/2015 | Perez Monsrreal | B01D 21/2483 210/151 |
| 2015/0108065 | A1* | 4/2015 | Liao | C02F 3/006 210/601 |
| 2018/0155224 | A1* | 6/2018 | Gotou | C02F 3/327 |

* cited by examiner

METHOD FOR REUSING FARMLAND DRAINAGE

TECHNICAL FIELD

The invention relates to the technical field of agricultural irrigation and drainage, in particular to a method for reusing farmland drainage.

BACKGROUND

In modern rural areas, although water-saving irrigation technology is being vigorously promoted, flood irrigation with high irrigation quota still exists at present and in the future. A large amount of farmland drainage is randomly discharged, and some farmland drainage containing chemical fertilizers and other substances become groundwater through leakage, polluting groundwater, while the rest is directly discharged into rivers or lakes, which easily cause eutrophication of water bodies.

The existing farmland drainage is to drain farmland drainage to a water collecting tank for collection, and the collected water is used directly to irrigate farmland to realize secondary utilization. However, although in this way farmland drainage is used for the second time, when farmland drainage enters the water collecting tank, weeds, branches and leaves and other sundries carried in farmland drainage are easy to rot in the water collecting tank, which further pollutes the water. If the polluted water in the water collecting tank is used for irrigation, the eggs and germs carried in the water will easily cause pests on crops, therefore unable to realize secondary utilization of farmland drainage.

SUMMARY

An objective of the invention is to provide a method for reusing farmland drainage to solve the problems existing in the prior art.

In order to achieve the above objective, the invention provides the following solution: the invention provides a method for reusing farmland drainage, and a device used in the method may include a purifying pond, a filtering mechanism, a water pump and a drainage pipe; and the method may include the following specific operation steps:

(a) siting and constructing the purifying pond, which specifically includes: according to landform characteristics of farmland, siting a wide and suitable place close to the farmland to thereby construct the purifying pond, and carrying out an anti-seepage treatment on the purifying pond, and connecting the purifying pond with anti-seepage channels of the farmland;

(b) purifying the water in the purifying pond, which specifically includes: adding flocculants into the water through the filtering mechanism to remove particulate organic substances, suspended substances, colloid and phosphate pollutants in the water; and (c) reusing the purified water, which specifically includes: pumping and discharging the purified water to an upstream of each of the anti-seepage channels with the water pump and the drainage pipe to thereby reuse the water.

In an embodiment, in the step (a), when constructing the purifying pond, a partition plate is fixedly arranged in the purifying pond, a height of the partition plate is smaller than that of the purifying pond; the partition plate divides the purifying pond into a sedimentation tank and a water collecting tank; a water inlet pipe is fixedly connected to a top end of the sedimentation tank; the water pump is located in the water collecting tank, and the discharge pipe is fixedly connected to a water outlet end of the water pump.

In an embodiment, in the step (b), the filtering mechanism may include a first filter and a second filter, the first filter and the second filter are respectively arranged at a water inlet end and a water outlet end of the water inlet pipe, and the second filter is located in the sedimentation tank.

In an embodiment, the first filter comprises a water inlet trough fixedly connected to the water inlet pipe, a sliding block slidably connected to a bottom of the water inlet trough, a filtering bag detachably connected to the sliding block, and a filtering bag is in clearance fit with a groove wall of the water inlet trough.

In an embodiment, the filtering bag may include telescopic pipes, one end of each of the telescopic pipes is fixedly connected to a net ring, and a filtering net is fixedly connected to the other end of each of the telescopic pipes, a bottom of the net ring is detachably connected to the sliding block, a top of the net ring is fixedly connected to a handle, and the filtering net is arranged on a nozzle of the water inlet pipe.

In an embodiment, the telescopic pipe is a corrugated pipe.

In an embodiment, the second filter comprises a barrel body and a barrel cover, the barrel cover is openably and closably connected to the barrel body; a top of the barrel body is communicated/connected with the water outlet end of the water inlet pipe, and a bottom end of the barrel body is provided with a water outlet; a first filtering net and a second filtering net are arranged in the barrel body, and the first filtering net is located above the second filtering net; an inner wall of the barrel body is fixedly connected to positioning blocks, a top of each of the positioning blocks is provided with a positioning groove, and bottoms of the first filtering net and the second filtering net are respectively fixedly connected to limiting blocks, each of the limiting blocks is matched with the corresponding positioning groove.

In an embodiment, the barrel body is communicated with a connecting pipe; an end of the connecting pipe is communicated with a dosing barrel, the connecting pipe is located below the second filtering net, an electromagnetic valve and a flowmeter are installed on the connecting pipe, and the electromagnetic valve is located between the flowmeter and the dosing barrel.

In an embodiment, the water outlet is rotatably connected to a stirring impeller, the stirring impeller may include fixing rings, rotating rings and stirring blades; the fixing rings are fixedly installed on an inner wall of the water outlet, the rotating rings are rotationally connected to the fixing rings respectively, and edges of the stirring blades are fixedly connected to the rotating rings respectively.

In an embodiment, a top of the purifying pond is covered with a tarpaulin.

In an embodiment, the purifying pond has a length of 6 m, a width of 3 m, a depth of 2 m and a capacity of 36 $m^3$, and a capacity of the water collecting tank is 24 $m^3$-30 $m^3$.

The invention discloses the following technical effects: according to the method for reusing farmland drainage provided by the invention, when the purifying pond is constructed, the filtering mechanism is installed on the water inlet pipe of the purifying pond, which filters the impurities in farmland drainage, so water will not be polluted. After the water in the purifying pond is purified, most impurities in the water are removed, so that the water flowing into the water collecting tank is clear and transparent, and the water in the water collecting tank can be stored for a longer time when the water quantity is small, or can be directly discharged into rivers and lakes when the water quantity is large, without causing pollution to rivers and lakes.

BRIEF DESCRIPTION OF DRAWINGS

In order to explain the embodiments of the invention or the technical solution in the prior art more clearly, the following will briefly introduce the drawings used in the embodiments. Obviously, the drawings in the following description are only some embodiments of the invention, and for those of ordinary skill in the art, other drawings can be obtained according to these drawings without paying creative labor.

Figure 1:
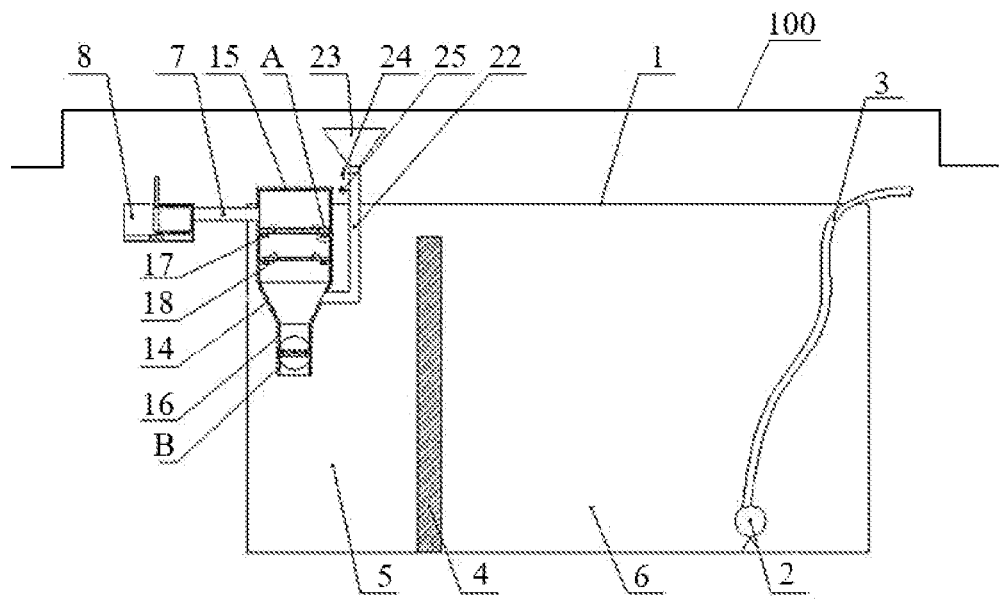
FIG. 1 is a schematic structural diagram of a purifying pond of the invention.
Figure 2:
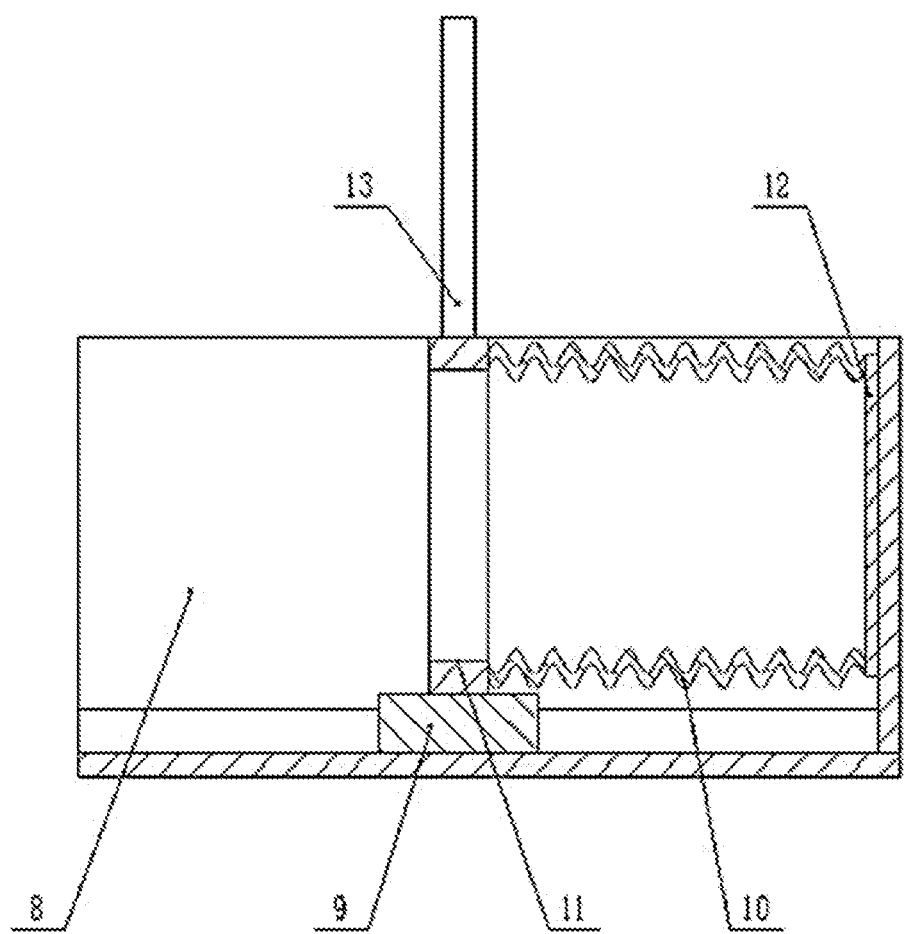
FIG. 2 is a schematic structural diagram of a first filter of the invention.
Figure 3:
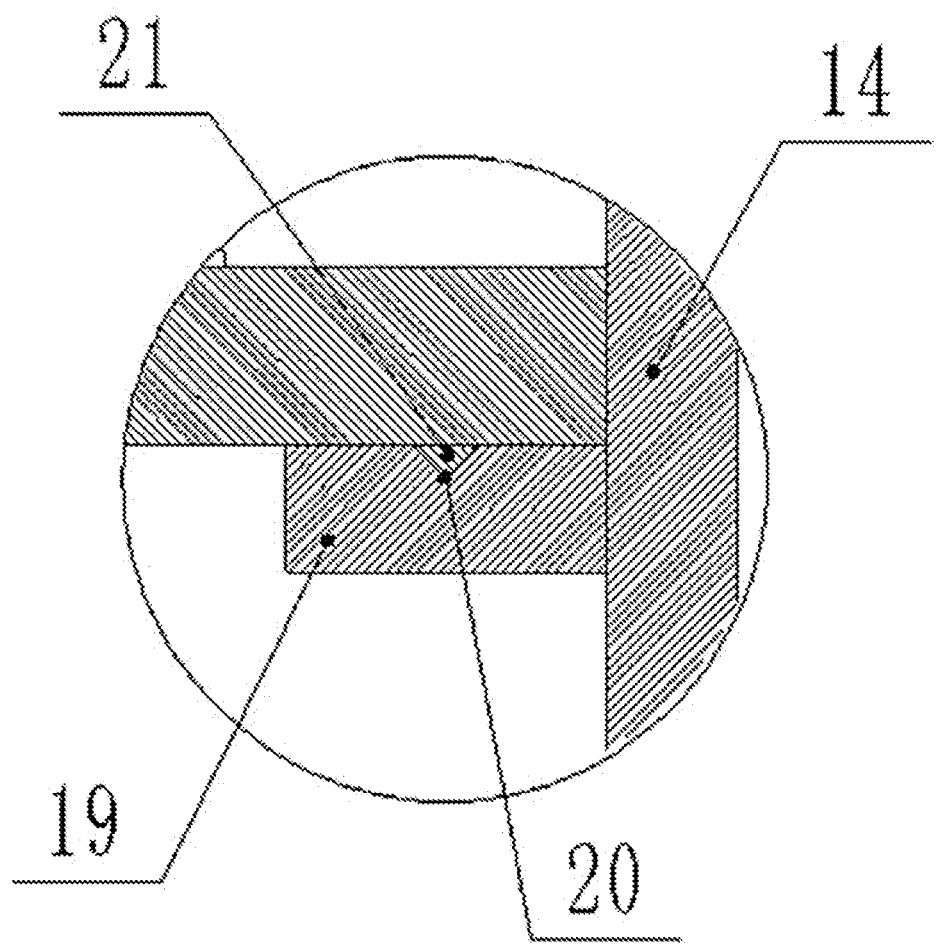
FIG. 3 is a partial enlarged view of part A in FIG. 1.
Figure 4:
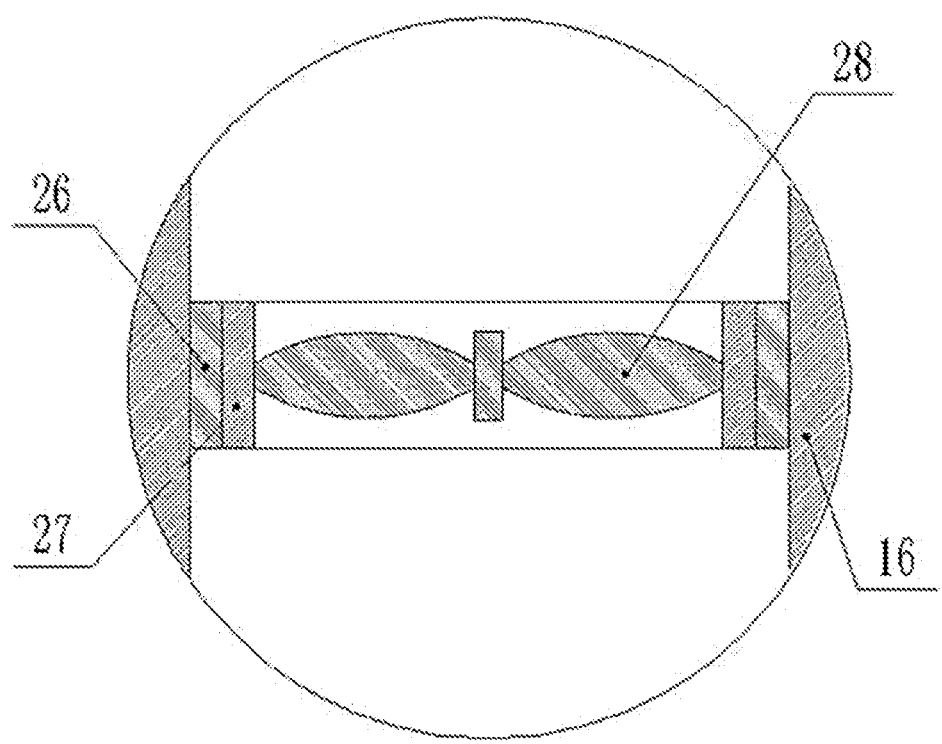
FIG. 4 is a partial enlarged view of part B in FIG. 1.

description of reference numerals: purifying pond—1; water pump—2; drainage pipe—3; partition plate—4; sedimentation tank—5; water collecting tank—6; water inlet pipe—7; water inlet trough —8; sliding block—9; telescopic pipe—10; net ring—11; filtering net—12; handle—13; barrel body—14; barrel cover—15; water outlet—16; first filtering net—17; second filtering net—18; positioning block—19; positioning groove—20; limiting block—21; connecting pipe—22; dosing barrel—23; electromagnetic valve—24; flowmeter—25; fixing ring—26; rotating ring—27; stirring blade —28, tarpaulin—100.

DETAILED DESCRIPTION OF EMBODIMENTS

The following will clearly and completely describe the technical scheme in the embodiments of the invention with reference to the drawings in the embodiments of the invention. Obviously, the described embodiments are only part of the embodiments of the invention, not all of them. Based on the embodiments of the invention, all other embodiments obtained by those of ordinary skill in the art without creative labor fall in the scope of protection of the invention.

In order to make the above objectives, features and advantages of the invention more obvious and easier to understand, the invention will be further explained in detail with reference to the drawings and specific embodiments.

The invention provides a method for reusing farmland drainage. A device used in the method may include a purifying pond 1, a filtering mechanism, a water pump 2 and a drainage pipe 3, and the specific operation steps of the method are as follows:

(a) siting and constructing the purifying pond 1, which specifically includes: according to landform characteristics of farmland, siting a wide and suitable place close to the farmland to thereby construct purifying pond 1, and carrying out an anti-seepage treatment on purifying pond 1, and connecting the purifying pond 1 with the anti-seepage channels of the farmland;

(b) purifying water in the purifying pond 1, which specifically includes: adding flocculants into the water through the filtering mechanism to remove particulate organic substances, suspended substances, colloid and phosphate pollutants in the water; and (c) reusing the purified water, which specifically includes: pumping and discharging the purified water to an upstream of each of the anti-seepage channels with the water pump 2 and the drainage pipe 3 to thereby reuse the water.

Further, in step (a), when constructing the purifying pond 1, a partition plate 4 is fixedly installed in the purifying pond 1, a height of partition plate 4 is smaller than that of the purifying pond 1, the partition plate 4 divides the purifying pond 1 into a sedimentation tank 5 and a water collecting tank 6; the water pump 2 is located in the water collecting tank 6, and the drainage pipe 3 is fixedly connected to a water outlet end of the water pump 2; the purifying pond 1 is 6 meters (m) in length, 3 m in width, 2 m in depth and 36 cubic meters ($m^3$) in storage capacity, and a storage capacity of the water collecting tank 6 is 24 $m^3$-30 $m^3$.

Further, in order to facilitate collection of impurities in farmland drainage, a water inlet pipe 7 is fixedly connected to the top of the sedimentation tank 5, and the filtering mechanism may include a first filter and a second filter which are respectively installed at a water inlet end and a water outlet end of the water inlet pipe 7, and the second filter is located in the sedimentation tank 5.

Further, the farmland drainage is primarily filtered by the first filter, which may include a water inlet trough 8 fixedly connected to the water inlet pipe 7, a sliding block 9 slidably connected to a bottom of the water inlet trough 8, and a filtering bag detachably connected to the sliding block 9; and the filtering bag is in clearance fit with a groove wall of the water inlet trough 8. The filtering bag may include telescopic pipes 10, each of the telescopic pipes 10 is a corrugated pipe. A net ring 11 is fixedly connected to one end of each of the telescopic pipes 10, and a filtering net 12 is fixedly connected to the other end of each of the telescopic pipes 10. A bottom of the net ring 11 is detachably connected to the sliding block 9, and a handle 13 is fixedly connected to a top of the net ring 11. The filtering net 12 is covered on a nozzle of the water inlet pipe 7. When there are many sundries on the water inlet trough 8 and the filtering net 12, the handle 13 drives the net ring 11 to move along a length direction of the water inlet trough 8, so that the impurities in the water inlet trough 8 are put into the filtering net bag, and hence the filtering bag can filter and collect large sundries in farmland drainage. After collection, only the filtering net bag needs to be replaced.

Further, the farmland drainage is filtered for the second time by a second filter, the second filter may include a barrel body 14 and a barrel cover 15 openably connected with the barrel body 14. A top of the barrel body 14 is communicated/connected with the water outlet end of the water inlet pipe 7, and a bottom end of the barrel body 14 is provided with a water outlet 16. A first filtering net 17 and a second filtering net 18 are arranged in the barrel body 14, and the first filtering net 17 is located above the second filtering net 18. Positioning block 19 is fixedly connected to the inner wall of the barrel body 14, and positioning grooves 20 are formed on tops of the positioning blocks 19 respectively. Limiting blocks 21 are fixedly connected to the bottom of the first filtering net 17 and the second filtering net 18 respectively, and the limiting blocks 21 are matched with the positioning grooves 20 respectively. The first filtering net 17 and the second filtering net 18 are used to filter and collect small impurities in farmland drainage. When there are many impurities on the first filtering net 17 or the second filtering net 18, the first filtering net 17 or the second filtering net 18 can be lifted out of the barrel body 14 by using lifting lugs fixed on the filtering nets to realize replacement, thereby reducing impurities entering the water in the sedimentation tank 5, avoiding water from being corrupted, reducing mosquito breeding in the water, and thereby avoiding diseases and insect pests of crops caused by irrigation farmland drainage.

Further, in order to remove particulate organic substances, suspended substances, colloid and phosphate pollutants from water, a connecting pipe 22 is connected to the barrel body 14, a dosing barrel 23 is connected to an end of the connecting pipe 22, and the connecting pipe 22 is located below the second filtering net 18. In order to control the dosing amount, an electromagnetic valve 24 and a flowmeter 25 are installed on the connecting pipe 22, and the electromagnetic valve 24 is located between the flowmeter 25 and the dosing barrel 23. The water outlet 16 is rotatably connected to a stirring impeller, the stirring impeller may include fixing rings 26, rotating rings 27 and stirring blades 28. The fixing rings 26 are fixedly installed on an inner wall of the water outlet 16, the rotating rings 27 are rotatably connected to the fixing rings 26 respectively, and edges of the stirring blades 28 are fixedly connected to the rotating rings 27. The flocculant is added into the farmland drainage through the dosing barrel 23. When the filtered farmland drainage flows out of the barrel body 14 through the water outlet 16, the stirring blades 28 are driven to rotate; the flocculant and farmland drainage are completely mixed by rotating of the stirring blades 28, which makes the suspended substances and colloidal substances in the water form flocs with larger specific gravity, and then the flocs and water are separated in the sedimentation tank 5; during flocculation and sedimentation, the particulate organic substances, suspended solids, colloid and phosphate pollutants in polluted river water are effectively removed, and the precipitated water is clear and transparent, which will be collected in the water collecting tank 6 for reuse.

Further, in order to prevent weeds and crop residues from entering the purifying pond 1, a top of the purifying pond 1 is covered with a tarpaulin 100, and the purifying pond 1 is covered with the tarpaulin 100 to prevent sundries from entering the purifying pond 1.

In the description of the invention, it should be understood that the terms "longitudinal", "transverse", "upper", "lower", "front", "rear", "left", "right", "vertical", "horizontal", "top", "bottom", "inner" and "outer" indicated orientations or positional relationships are based on the orientations or positional relationships shown in the drawings, which are only for the convenience of describing the invention, but do not indicate or imply that the referred devices or elements must have a specific orientation, be constructed and operated in a specific orientation, so they cannot be understood as limiting the invention.

The above embodiments only describe the preferred mode of the invention, but do not limit the scope of the invention. On the premise of not departing from the design spirit of the invention, various modifications and changes made by those of ordinary skill in the art to the technical solution of the invention shall fall within the protection scope determined by the claims of the invention.

What is claimed is:

1. A device for reusing farmland drainage, comprising: a purifying pond, a filtering mechanism, a water pump and a drainage pipe;

wherein the purifying pond is configured to be connected with anti-seepage channels of farmland, the filtering mechanism is configured to add flocculants therethrough into water to purify the water, and the water pump and the drainage pipe are configured to pump and discharged the purified water from the purifying pond to an upstream of the anti-seepage channels;

wherein a partition plate is fixedly installed in the purifying pond, a height of the partition plate is smaller than that of the purifying pond, the partition plate divides the purifying pond into a sedimentation tank and a water collecting tank; a water inlet pipe is fixedly connected to a top end of the sedimentation tank, the water pump is located in the water collecting tank, and the drainage pipe is fixedly connected to a water outlet end of the water pump;

wherein the filtering mechanism comprises a first filter and a second filter, the first filter and the second filter are respectively arranged at a water inlet end and a water outlet end of the water inlet pipe, and the second filter is located in the sedimentation tank;

wherein the first filter comprises a water inlet trough fixedly connected to the water inlet pipe, a sliding block slidably connected to a bottom of the water inlet trough, and a filtering bag detachably connected to the sliding block; and the filtering bag is in clearance fit with a groove wall of the water inlet trough;

wherein the filtering bag comprises a telescopic pipe, one end the telescopic pipe is fixedly connected to a net ring, and a filtering net is fixedly connected to the other end of the telescopic pipe, a bottom of the net ring is detachably connected to the sliding block, a top of the net ring is fixedly connected to a handle, and the filtering net is arranged on a nozzle of the water inlet pipe;

wherein the second filter comprises a barrel body and a barrel cover openably and closably connected to the barrel body; a top of the barrel body is connected with the water outlet end of the water inlet pipe, and a bottom end of the barrel body is provided with a water outlet; a first filtering net and a second filtering net are arranged in the barrel body, and the first filtering net is located above the second filtering net; an inner wall of the barrel body is fixedly connected to positioning blocks, a top of each of the positioning blocks is provided with a positioning groove, bottoms of the first filtering net and the second filtering net are respectively fixedly connected to limiting blocks, and each of the limiting blocks is matched with the corresponding positioning groove;

wherein the barrel body is connected with a connecting pipe; an end of the connecting pipe is connected with a dosing barrel, another end of the connecting pipe is connected below the second filtering net, an electromagnetic valve and a flowmeter are installed on the connecting pipe, and the electromagnetic valve is located between the flowmeter and the dosing barrel; and wherein the water outlet is rotatably connected to a stirring impeller, the stirring impeller comprises a fixing ring, a rotating ring and stirring blades; the fixing ring is fixedly installed on an inner wall of the water outlet, the rotating ring is rotationally connected to the fixing ring, and edges of the stirring blades are fixedly connected to the rotating ring.

2. The device for reusing farmland drainage according to claim 1, wherein the telescopic pipe is a corrugated pipe.

3. The device for reusing farmland drainage according to claim 1, wherein a top of the purifying pond is covered with a tarpaulin.

4. A method for reusing farmland drainage using the device according to claim 1, wherein the method comprises:

connecting the purifying pond with anti-seepage channels of farmland;

adding flocculants into water through the filtering mechanism to remove particulate organic substances, suspended substances, colloid and phosphate pollutants in the water to thereby obtain purified water; and pumping and discharging the purified water from the purifying pond to an upstream of the anti-seepage channels by the water pump and the drainage pipe to thereby reuse the water.

5. The method according to claim 4, further comprising: carrying out an anti-seepage treatment on the purifying pond.

* * * * *